July 28, 1931. M. RIVKIN 1,816,746

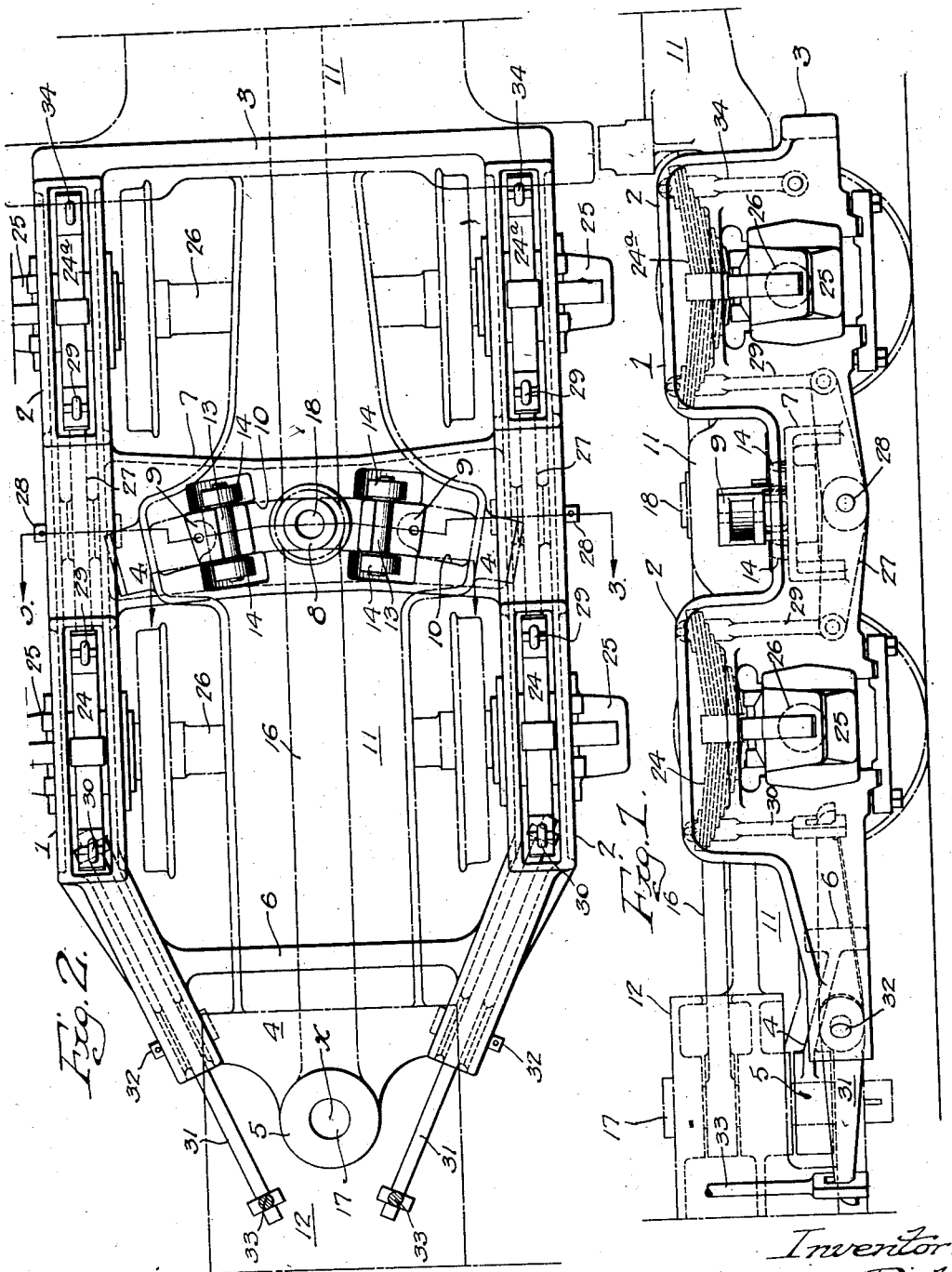

FOUR-WHEEL RADIAL TRUCK

Filed June 20, 1930 2 Sheets-Sheet 2

Inventor:—
Menchem Rivkin
by his Attorneys
Howson & Howson

Patented July 28, 1931

1,816,746

UNITED STATES PATENT OFFICE

MENAHEM RIVKIN, OF PHILADELPHIA, PENNSYLVANIA

FOUR-WHEEL RADIAL TRUCK

Application filed June 20, 1930. Serial No. 462,609.

My invention relates to certain improvements in four-wheel rear trucks for locomotives. The invention is particularly used in connection with the rear end frame as shown in a companion application, Serial No. 462,009, filed June 18, 1930.

One object of this invention is to improve the construction of a radial swing truck by which it can be adapted to the frame described in the above-mentioned application and which will be guided by radial rails on the frame, with a radius taken from the point at which the truck is pivoted to the main frame.

A further object of the invention is to so design the truck that the weight of the rear end of the locomotive is received at a central radial line.

The invention also relates to certain details of construction which will be fully described hereinafter.

In the accompanying drawings:

Figure 1 is a side view of the improved four-wheel truck, the main frame of the locomotive being shown in dotted lines;

Fig. 2 is a plan view of the truck, showing the axle and wheels in dotted lines and the engine frame in dotted lines;

Figure 3:
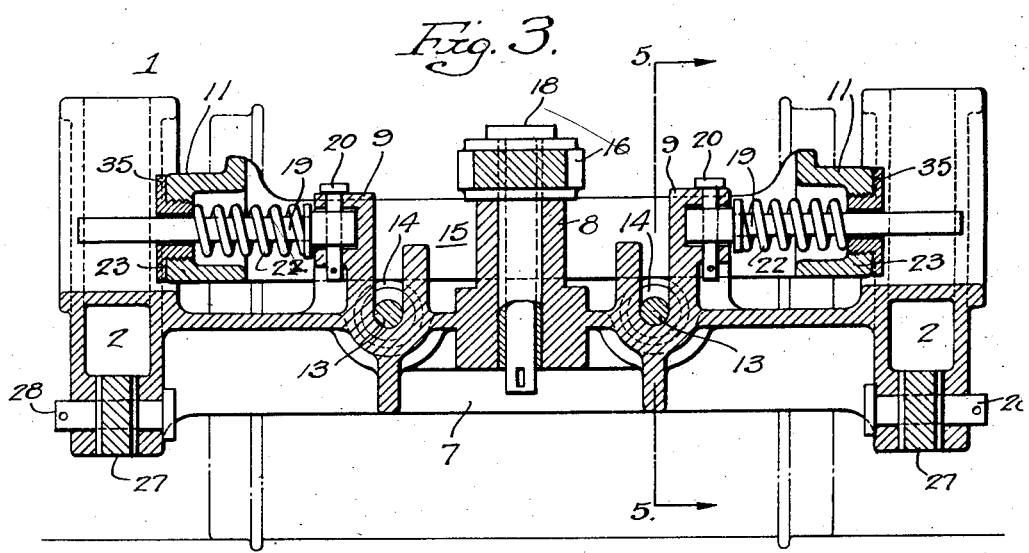
Fig. 3 is a sectional view on the line 3—3, Fig. 2, showing centering devices, with the engine frame in full lines.
Figure 4:
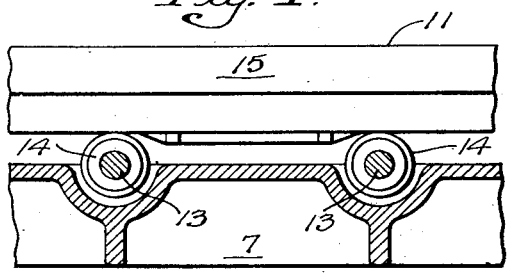
Fig. 4 is a sectional view on the line 4—4, Fig. 2.
Figure 5:
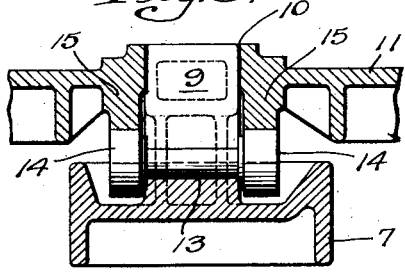
Fig. 5 is a sectional view on the line 5—5, Fig. 3.

1 is the frame of the truck, which is made in the present instance as an integral structure having side members 2—2, a member 3 at one end of the truck, a member 4 at the opposite end of the truck forming a radius bar, a pivot pin bearing 5, and a reinforcing transverse member 6. The side members 2—2 are in the form of inverted channels and these channels are open at the top above the equalizing springs. At the center of the truck is a cross-tie 7 which has a center pin bearing 8 and two upright projections 9 which fit the radial slot 10 formed in the extension 11 of the main frame 12 of the locomotive. This frame is shown in dotted lines in Figs. 1 and 2 and in full lines in Fig. 3. The particular construction of this frame is set forth in a pending application, Serial No. 462,009, filed June 18, 1930.

The projections 9 are recessed as shown in Fig. 3 to receive the short shafts 13 on which are mounted the rollers 14 which bear against the underside of the rails 15 and form an integral part of the center cross-tie 7. The radial slot in the frame is taken from the point $x$, Fig. 2, which is the pivot point of the truck. Pivoted to the frame of the truck is a draw bar 16. This draw bar extends to the rear end of the locomotive and is coupled to the tender. The draw bar is also set forth and claimed in a separate application filed June 20, 1930, under Serial No. 462,610. This draw bar is mounted on the same pivot 17 as the truck and has an opening for the pivot pin 18 which extends through the pivot pin bearing 8 of the truck.

In some instances the pivot bearing 5 of the truck may be omitted. In this case the truck will depend upon the draw bar for radial movment.

Figure 6:
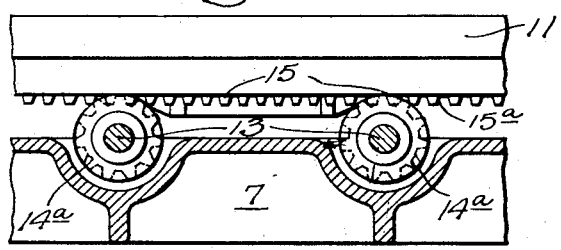
Figs. 6 and 7 are views of a modification showing a rack and pinion in combination with the rollers.
Figure 7:
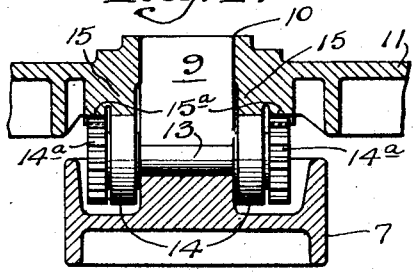
Figure 8:
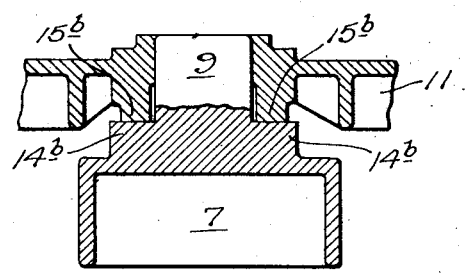
Fig. 8 is a modification of a view illustrating a slide as a substitute for the rollers.

In Figs. 6 and 7 pinions $14a$ are shown in addition to the rollers. These pinions mesh with racks $15a$ on the underside of the frame 11 of the truck. In some instances the rollers may be dispensed with and slide-ways $14b$ may be formed on the truck which slide under the portions $15b$ of the frame.

In order to center the truck after it has passed a curve, any suitable centering device may be used. In Fig. 3 I have shown one form of centering device consisting of rods 19 pivoted at 20 to the projecting portions 9 of the truck frame. Each rod 19 passes through an opening 21 in the extension 11 of the frame 12 and through an opening in the plate 35 secured to the outside of the socket 23 of the frame 11, and mounted on each rod is a spiral spring 22 which is located within a socket 23 of the extension 11, so that after the truck passes around the curve these springs tend to center the truck. The equalizing mechanism on each side of the truck is located within the side members 2 of the frame of the truck. Springs 24—24a extend over the pedestal openings and rest upon the boxes 25 of the axles 26. 27 is an equalizing leved pivoted to the center of the frame at 28. One arm of each equalizing lever is connected by a link 29 to one end of each spring 24—24a. The other end of the spring 24 is connected by a link 30 to a lever 31, which is pivoted at 32 to the frame and each of these levers is arranged diagonally as shown and connected by a link 33 to the main equalizing mechanism of the locomotive. The rear end of the spring 24a is connected by a link 34 to the main frame of the truck.

While I have shown the projection 8 on the cross-tie 7, in some instances the cross-tie 7 may be omitted and the projection may be mounted on the rear end 3 of the truck frame, and in this construction it will be understood that the radial slideway of the extension of the main frame would have to be moved so as to be above the rear end frame of the truck.

I claim:

1. The combination in a four-wheel radial truck for a locomotive, of an integral main frame consisting of two side frames; and a rear end frame and a forward frame having a bearing for a pivot pin by which it is connected to the main frame of the locomotive, the truck having a central projection arranged to be connected to a draw bar pivoted to the main frame and extending to the rear of the locomotive.

2. The combination in a four-wheel radial locomotive truck, of a main frame having side members and end members, one of said end members forming a radius bar by which the truck is pivoted to the main frame of the locomotive; an integral cross-tie, said cross-tie having projections arranged to extend into a radial slot in the main frame and having a central projection arranged to be adapted to a draw bar mounted on the same pivot as the truck and extending to the rear end of the locomotive.

3. The combination in a four-wheel radial locomotive truck, of an integral main frame having channeled side bars and end cross-bars, one of said cross-bars being in the form of a radius bar and having a pivot pin opening; a cross-tie at the center of the truck; projections on the cross-tie adapted to slide in a segmental slot in the frame; and equalizing mechanism located within the channels of the side frame and connected to the main equalizing mechanism of the locomotive.

4. The combination in a four-wheel radial locomotive truck, of an integral main frame consisting of side members and end members, one of which is in the form of a radius bar; a cross-tie extending from one side member to the other; a center pin bearing on the cross-tie arranged to be engaged by a draw bar, and a projection on each side of the center pin bearing arranged to extend into a radial slot in the main frame of the locomotive; and rollers carried by said projections and arranged to travel under the frame.

5. The combination in a four-wheel radial locomotive truck, of an integral main frame cosisting of side members and end members, one of which is in the form of a radius bar; a cross-tie extending from one side member to the other; a center pin bearing on the cross-tie arranged to be engaged by a draw bar; a projection on each side of the center pin bearing arranged to extend into a radial slot in the main frame of the locomotive; rollers carried by said projections and arranged to travel under the frame; and centering mechanism adapted to said projections and extending through openings in the main frame of the locomotive.

6. The combination in the main frame of a locomotive having a radial slot taken from the pivot pin on the frame, of a truck mounted under the frame and pivoted at the above-mentioned point to the frame, and having projections extending into the radial slot; rollers on the truck arranged to travel under the frame at each side of the slot; racks on the main frame of the locomotive; and pinions adjoining the rollers and arranged to mesh with the racks.

MENAHEM RIVKIN.